United States Patent
Ellen et al.

(10) Patent No.: US 10,282,670 B2
(45) Date of Patent: May 7, 2019

(54) METHOD OF WEBSITE OPTIMISATION FOR A WEBSITE HOSTED ON A SERVER SYSTEM, AND A SERVER SYSTEM

(71) Applicant: MAXYMISER LTD., Edinburgh (GB)

(72) Inventors: Peter Ellen, Edinburgh (GB); Steven Rose, Edinburgh (GB); Dimitris Tsomokos, London (GB)

(73) Assignee: MAXYMISER LTD, Redwood Shores, CA (US)

( * ) Notice: Subject to any disclaimer, the term of this patent is extended or adjusted under 35 U.S.C. 154(b) by 475 days.

(21) Appl. No.: 14/786,188

(22) PCT Filed: Sep. 30, 2013

(86) PCT No.: PCT/GB2013/052540
§ 371 (c)(1),
(2) Date: Oct. 22, 2015

(87) PCT Pub. No.: WO2014/177820
PCT Pub. Date: Nov. 6, 2014

(65) Prior Publication Data
US 2016/0078454 A1    Mar. 17, 2016

(30) Foreign Application Priority Data

Apr. 29, 2013 (GB) .................................. 1307702.9
Aug. 7, 2013 (GB) .................................. 1314101.5
Aug. 7, 2013 (GB) .................................. 1314102.3

(51) Int. Cl.
*G06N 7/00* (2006.01)
*G06Q 30/02* (2012.01)
(Continued)

(52) U.S. Cl.
CPC ....... *G06N 7/005* (2013.01); *G06F 17/30598* (2013.01); *G06Q 30/02* (2013.01);
(Continued)

(58) Field of Classification Search
CPC ......... G06Q 10/00; G06Q 40/00; G06F 17/60
(Continued)

(56) References Cited

U.S. PATENT DOCUMENTS 8,538,786 B2 * 9/2013 Linehan ................. G06Q 10/06
                                                          705/7.11
9,706,345 B2 * 7/2017 Davis ...................... H04W 4/02
(Continued)

FOREIGN PATENT DOCUMENTS

EP          1 004 967 A1    5/2000

OTHER PUBLICATIONS

Ivan "Business Rule Model", Database Design and Development, pp. 1-3 (Year: 2011).*
(Continued)

*Primary Examiner* — Romain Jeanty
(74) *Attorney, Agent, or Firm* — Invoke

(57) ABSTRACT

There is provided a method of website optimization for a website hosted on a server system, the website for use by a plurality of users, the method including steps executed by the server system of: (i) collecting data for constructing a plurality of user profiles corresponding to the plurality of users; (ii) constructing the plurality of user profiles using the collected data; (iii) quantifying affinities between the plurality of user profiles; (iv) constructing a user network map, in which users are represented as nodes, and in which the affinities are represented as links between the nodes; (v) segmenting the user network map into a plurality of communities of users, and (vi) providing website content to each user according to the segmented community of each user.

27 Claims, 10 Drawing Sheets

(51) Int. Cl.
 *G06F 17/30* (2006.01)
 *G06Q 50/00* (2012.01)
 *H04L 29/08* (2006.01)
(52) U.S. Cl.
 CPC ......... *G06Q 30/0201* (2013.01); *G06Q 50/01* (2013.01); *H04L 67/02* (2013.01); *H04L 67/306* (2013.01)
(58) Field of Classification Search
 USPC .................................................. 705/7.29
 See application file for complete search history.

(56) References Cited

U.S. PATENT DOCUMENTS

| | | | | |
|---|---|---|---|---|
| 2011/0173264 | A1* | 7/2011 | Kelly | G06Q 10/10 709/205 |
| 2012/0191545 | A1* | 7/2012 | Leibu | G06Q 30/02 705/14.66 |
| 2013/0073473 | A1* | 3/2013 | Heath | G06Q 30/02 705/319 |
| 2013/0279354 | A1* | 10/2013 | Ekman | H04W 24/00 370/252 |
| 2014/0280214 | A1* | 9/2014 | Han | G06F 17/30943 707/748 |
| 2015/0293997 | A1* | 10/2015 | Smith | H04L 51/32 707/749 |

OTHER PUBLICATIONS

International Search Report, dated Nov. 26, 2013, issued in priority International Application No. PCT/GB2013/052540.

* cited by examiner

SELECT TOP 10
User_ID, Item_HASH
FROM nameOfClient_src.pr.tbl_Fact_Purchases

| User_ID | Item_HASH |
|---|---|
| 975676924 | 1345207523 |
| 1619201613 | -1384105381 |
| -584532828 | -1103713053 |
| -1470352544 | -1068707556 |
| -1958275692 | -739953679 |
| -1913582543 | -1171189919 |
| -440775581 | 1753724941 |
| -589197907 | 1568518631 |
| -156118198 | 246394871 |
| -2089515451 | 1092251657 |

FIGURE 2

$$\frac{A \cdot B}{\|A\|\|B\|} = \frac{\sum_{i=1}^{n} A_i \times B_i}{\sqrt{\sum_{i=1}^{n}(A_i)^2} \times \sqrt{\sum_{i=1}^{n}(B_i)^2}} \quad \text{(A)}$$

$$r = \frac{\sum_{i=1}^{n}(X_i - \bar{X})(Y_i - \bar{Y})}{\sqrt{\sum_{i=1}^{n}(X_i - \bar{X})^2}\sqrt{\sum_{i=1}^{n}(Y_i - \bar{Y})^2}} \quad \text{(B)}$$

$$J(A, B) = \frac{|A \cap B|}{|A \cup B|} \quad \text{(C)}$$

FIGURE 4

```
# Open and read file with data table from SQL query
cleaner_data = open('buyers.csv').read().splitlines()

# Turn this into "Transactions" list, one entry per line
Transactions = list()
for line in cleaner_data:
    Transactions.append(line.split(','))

# Create a Customer dictionary, where key is UserID
import collections
Customers = collections.defaultdict(list)
for line in Transactions:
    Customers[line[0]].extend(line[1:])

# Calculate similarities between Customers; write in file
E_dat = file('edgelist.dat','w')
UserID = [user for user in Customers]
for x in range(len(UserID)-1):
    for y in range(x+1,len(UserID)):
        hits = len(set(Customers[UserID[x]]) & set(Customers[UserID[y]]))
        if hits > 0:
            print >> E_dat, ' '.join((str(x), str(y)))
```

FIGURE 5

$$x(t) = \frac{\exp(At)\,x(0)}{\|\exp(At)\,x(0)\|}, \qquad (1)$$

$$P_j = \lim_{t \to \infty} j^T x(t). \qquad (2)$$

$$P_j = \lim_{t \to \infty} \frac{\sum_i \exp(\lambda_i t)\, j^T v_i v_i^T x(0)}{\sum_i \exp(\lambda_i t)\, 1^T v_i v_i^T x(0)}. \qquad (2a)$$

$$P_j \simeq [\exp(\lambda_1 t)\, j^T v_1 v_1^T x(0)] / [\exp(\lambda_1 t)\, 1^T v_1 v_1^T x(0)] \qquad (2b)$$

$$\theta_j(k) \equiv \mathrm{sgn}[P_j - \tilde{P}_j(k)], \qquad (2c)$$

FIGURE 7

$$P_j \simeq \frac{j^T v_1}{\|v_1\|}, \quad (3)$$

$$\theta_j(k) = \text{sgn}\left(j^T \delta_k\right), \quad (4)$$

$$\delta_k \equiv \frac{v_1}{\|v_1\|} - \frac{\tilde{v}_1}{\|\tilde{v}_1\|}, \quad (5)$$

$$\alpha_{ij} = \sum_{k=1}^{r} \frac{\theta_i(k)\theta_j(k)}{r}, \quad (6)$$

FIGURE 8

METHOD OF WEBSITE OPTIMISATION FOR A WEBSITE HOSTED ON A SERVER SYSTEM, AND A SERVER SYSTEM

CROSS REFERENCE TO RELATED APPLICATIONS

This application claims the priority of PCT/GB2013/052540, filed on Sep. 30, 2013, which claims the benefit of priority to Great Britain Application No. 1307702.9, filed on Apr. 29, 2013; Great Britain Application No. 1314101.5, filed on Aug. 7, 2013; and Great Britain Application No. 1314102.3, filed on Aug. 7, 2013, the entire contents of each of which are fully incorporated herein by reference.

BACKGROUND OF THE INVENTION

1. Field of the Invention

The field of the invention relates to methods of website optimisation for a website hosted on a server system, as well as to related server systems, to related computer software, and to computer terminals in communication with related server systems.

2. Technical Background

Communications network-based marketers are frequently seeking answers to, and are essentially guided by, two very related questions, namely, "Who are my customers" and "What do they need from my business?"

The first of these questions has typically been addressed with the use of statistical modelling techniques as part of tailor-made solutions for businesses, using decades-old toolsets for data clustering. These tools vary in their degree of flexibility and adaptability, but most of them rely on specifying beforehand the number of segments that the customer base should be split into, no matter what is the actual number and consistency of naturally occurring segments. In addition, the solutions offered rely mostly on offline data from Customer Relationship Management (CRM) databases and further analysis is needed in order to incorporate and take into account data from different channels, such as online clickstream and online user-profile data. This is a painstaking process, which takes time and typically costs significant amounts to businesses of any size, as the complexity of the task increases with the size of the dataset.

Crucially, these methods can only attempt to answer the second question using best-fit models that necessarily make numerous assumptions on the likely behaviour of a business's customer base. At the end of this process, marketers still need to supplement the analysis with their own customer profiling, without having been given any objective 'ranking' of importance or relevance of customers in each segment, according to a natural and emergent property. In brief, marketers are not basing their customer profiling directly on the underlying data but instead need to add various assumptions to the analysis.

3. Discussion of Related Art

EP1004967B1 discloses a method and system for employing image recognition techniques to produce a photocollage from a plurality of images wherein the system obtains a digital record for each of the plurality of images, assigns each of the digital records a unique identifier and stores the digital records in a database; automatically sorts the digital records using at least one date type to categorize each of the digital records according at least one predetermined criteria; employs means responsive to the sorting step to compose a photocollage from the digital records. The method and system employ data types selected from pixel data; metadata; product order information; processing goal information; or customer profile to automatically sort data typically by culling or grouping to categorize according to either an event, a person, or chronologically. Hence EP1004967B1 discloses a method of grouping, the method employing customer profile data.

SUMMARY OF THE INVENTION

According to a first aspect of the invention there is provided a method of website optimisation for a website hosted on a server system, the website for use by a plurality of users, the method including steps executed by the server system of:

(i) collecting data for constructing a plurality of user profiles corresponding to the plurality of users;
(ii) constructing the plurality of user profiles using the collected data;
(iii) quantifying affinities between the plurality of user profiles;
(iv) constructing a user network map, in which users are represented as nodes, and in which the affinities are represented as links between the nodes;
(v) segmenting the user network map into a plurality of communities of users, and
(vi) providing website content to each user according to the segmented community of each user.

An advantage is that the server system operates in a new way because it provides website content to each user according to the segmented community of each user. A further advantage is that there is a technical effect on a process which is carried on outside the server system because when accessing the website, users receive website content according to their segmented community. A further advantage is that the segmentation is efficient because it is performed using segmentation of a user network map, which augments the other advantages.

The method may be one wherein collecting data is performed by collecting clickstream data.

The method may be one wherein collected data includes web analytics data or visitor behavior data.

The method may be one wherein collected data includes online customer data.

The method may be one wherein collected data includes offline customer data.

The method may further comprise the step of feeding collected data into a structured database schema.

The method may be one wherein user profiles are constructed using interactions between the users and a plurality of items.

The method may be one wherein user profiles are constructed using a user ID for each user, and a user vector U associated with each user ID, the vector U having N dimensions, where each dimension corresponds to a feature from the user and item spaces.

The method may be one wherein affinities are quantified using a user-item matrix, wherein the matrix includes data relating to user interactions with the plurality of items.

The method may be one wherein data relating to user interactions with the plurality of items is user-assigned.

The method may be one wherein data relating to user interactions with the plurality of items is given automatically.

The method may be one wherein affinities are quantified using a cosine similarity formula, a Pearson correlation formula, or a Jackard similarity formula.

The method may be one wherein a thickness of a respective link between nodes corresponds to a respective affinity between user profiles corresponding to the nodes.

The method may be one wherein segmenting the user network map into communities of users is self-adapting.

The method may be one wherein segmenting the user network map into communities of users is performed using network analysis tools.

The method may be one wherein segmenting the user network map into communities of users is performed using social network theory algorithms.

The method may be one wherein segmenting the user network map into communities of users is performed using a Principal Eigenvector Perturbation Algorithm.

The method may be one wherein segmenting the user network map into communities of users is performed using multi-level community detection algorithms.

The method may be one wherein segmenting the user network map into a plurality of communities of users includes segmenting the user network map into a number of communities, wherein the number is determined using the network map.

The method may be one wherein segmenting the user network map into a plurality of communities of users is such that it is the very structure of the user network map that dictates the emergence of various user communities.

The method may be one wherein segmenting the user network map into a plurality of communities of users is such that Customer Communities, cliques and hubs; authorities and peripheries; bridges and influential carriers of information are identified.

The method may be one wherein the method includes a step of characterizing communities of users via their most prevalent attributes.

The method may be one wherein the method is applied iteratively.

The method may be one wherein the server system consists of a single server.

The method may be one wherein the server system comprises a plurality of servers.

The method may be one wherein the server system is cloud-based.

According to a second aspect of the invention, there is provided a computer implemented website optimisation system for website optimisation of a website hosted on a server system, the website for use by a plurality of users, the computer implemented website optimisation system including the server system, the server system running computer software configured to:

(i) collect data for constructing a plurality of user profiles corresponding to the plurality of users;
(ii) construct the plurality of user profiles using the collected data;
(iii) quantify affinities between the plurality of user profiles;
(iv) construct a user network map, in which users are represented as nodes, and in which the affinities are represented as links between the nodes;
(v) segment the user network map into a plurality of communities of users, and
(vi) provide website content to each user according to the segmented community of each user.

An advantage is that the server system operates in a new way because it provides website content to each user according to the segmented community of each user. A further advantage is that there is a technical effect on a process which is carried on outside the server system because when accessing the website, users receive website content according to their segmented community. A further advantage is that the segmentation is efficient because it is performed using segmentation of a user network map, which augments the other advantages.

The computer implemented website optimisation system of the second aspect of the invention may be configured to perform a method of according to a first aspect of the invention.

There is provided computer software according to a second aspect of the invention.

According to a third aspect of the invention, there is provided a server system hosting a website for use by a plurality of users, the server system running computer software configured to:

(i) collect data for constructing a plurality of user profiles corresponding to the plurality of users;
(ii) construct the plurality of user profiles using the collected data;
(iii) quantify affinities between the plurality of user profiles;
(iv) construct a user network map, in which users are represented as nodes, and in which the affinities are represented as links between the nodes;
(v) segment the user network map into a plurality of communities of users, and
(vi) provide website content to each user according to the segmented community of each user.

An advantage is that the server system operates in a new way because it provides website content to each user according to the segmented community of each user. A further advantage is that there is a technical effect on a process which is carried on outside the server system because when accessing the website, users receive website content according to their segmented community. A further advantage is that the segmentation is efficient because it is performed using segmentation of a user network map, which augments the other advantages.

The server system according to a third aspect of the invention may be configured to perform a method according to a first aspect of the invention.

According to a fourth aspect of the invention, there is provided a computer terminal running a user's application, the user's application in communication with a server system hosting a website, the user's application identifying the computer terminal to the server system, the server system hosting a website for use by a plurality of users, the server system running computer software configured to:

(i) collect data for constructing a plurality of user profiles corresponding to the plurality of users;
(ii) construct the plurality of user profiles using the collected data;
(iii) quantify affinities between the plurality of user profiles;
(iv) construct a user network map, in which users are represented as nodes, and in which the affinities are represented as links between the nodes;
(v) segment the user network map into a plurality of communities of users, and
(vi) provide website content to each user according to the segmented community of each user.

An advantage is that the server system operates in a new way because it provides website content to each user according to the segmented community of each user. A further advantage is that there is a technical effect on a process which is carried on outside the server system because when accessing the website, users receive website content according to their segmented community. A further advantage is that the segmentation is efficient because it is performed using segmentation of a user network map, which augments the other advantages.

The computer terminal according to a fourth aspect of the invention may be one wherein the server system is configured to perform a method according to a first aspect of the invention.

According to a fifth aspect of the invention, there is provided a method of segmenting a plurality of users into a plurality of communities of users, the method including steps of:
(i) collecting data for constructing a plurality of user profiles corresponding to the plurality of users;
(ii) constructing the plurality of user profiles using the collected data;
(iii) quantifying affinities between the plurality of user profiles;
(iv) constructing a user network map, in which users are represented as nodes, and in which the affinities are represented as links between the nodes, and
(v) segmenting the user network map into the plurality of communities of users.

An advantage is that the segmentation is efficient because it is performed using segmentation of a user network map.

The method may be one wherein the data for step (i) is collected using customer information relating to customers stored in a Customer Relationship Management (CRM) database system, and in step (iv) the map constructed is a network of customers and then in step (v) customers are clustered into distinct communities with common needs and interests. An advantage is that customer information relating to customers stored in a Customer Relationship Management (CRM) database system can be segmented efficiently using segmentation of a user network map in the manner described.

The method may be one wherein collecting data is performed by collecting clickstream data.

The method may be one wherein collected data includes web analytics data or visitor behavior data.

The method may be one wherein collected data includes online customer data.

The method may be one wherein collected data includes offline customer data.

The method may further comprise the step of feeding collected data into a structured database schema.

The method may be one wherein user profiles are constructed using interactions between the users and a plurality of items.

The method may be one wherein user profiles are constructed using a user ID for each user, and a user vector U associated with each user ID, the vector U having N dimensions, where each dimension corresponds to a feature from the user and item spaces.

The method may be one wherein affinities are quantified using a user-item matrix, wherein the matrix includes data relating to user interactions with the plurality of items.

The method may be one wherein data relating to user interactions with the plurality of items is user-assigned.

The method may be one wherein data relating to user interactions with the plurality of items is given automatically.

The method may be one wherein affinities are quantified using a cosine similarity formula, a Pearson correlation formula, or a Jackard similarity formula.

The method may be one wherein a thickness of a respective link between nodes corresponds to a respective affinity between user profiles corresponding to the nodes.

The method may be one wherein segmenting the user network map into communities of users is self-adapting.

The method may be one wherein segmenting the user network map into communities of users is performed using network analysis tools.

The method may be one wherein segmenting the user network map into communities of users is performed using social network theory algorithms.

The method may be one wherein segmenting the user network map into communities of users is performed using a Principal Eigenvector Perturbation Algorithm.

The method may be one wherein segmenting the user network map into communities of users is performed using multi-level community detection algorithms.

The method may be one wherein segmenting the user network map into a plurality of communities of users includes segmenting the user network map into a number of communities, wherein the number is determined using the network map.

The method may be one wherein segmenting the user network map into a plurality of communities of users is such that it is the very structure of the user network map that dictates the emergence of various user communities.

The method may be one wherein segmenting the user network map into a plurality of communities of users is such that Customer Communities, cliques and hubs; authorities and peripheries; bridges and influential carriers of information are identified.

The method may be one wherein the method includes a step of characterizing communities of users via their most prevalent attributes.

The method may be one wherein the method is applied iteratively.

The method may be one wherein the method is applied using a server system consisting of a single server.

The method may be one wherein the method is applied using a server system comprising a plurality of servers.

The method may be one wherein the server system is cloud-based.

According to a sixth aspect of the invention, there is provided a computer implemented system for segmenting a plurality of users into a plurality of communities of users, the system running computer software configured to:
(i) collect data for constructing a plurality of user profiles corresponding to the plurality of users;
(ii) construct the plurality of user profiles using the collected data;
(iii) quantify affinities between the plurality of user profiles;
(iv) construct a user network map, in which users are represented as nodes, and in which the affinities are represented as links between the nodes, and
(v) segment the user network map into the plurality of communities of users.

There is provided computer software according to a sixth aspect of the invention.

According to a seventh aspect of the invention, there is provided a server system for segmenting a plurality of users into a plurality of communities of users, the server system running computer software configured to:
(i) collect data for constructing a plurality of user profiles corresponding to the plurality of users;
(ii) construct the plurality of user profiles using the collected data;
(iii) quantify affinities between the plurality of user profiles;
(iv) construct a user network map, in which users are represented as nodes, and in which the affinities are represented as links between the nodes, and (v) segment the user network map into the plurality of communities of users.

BRIEF DESCRIPTION OF THE DRAWINGS

The above and other aspects of the invention will now be described, by way of example only, with reference to the following Figures, in which:

FIG. 2 shows a simple example of a least complex Structured Query Language (SQL) query on a table of Items.

FIG. 4 shows examples of formulas for use in methods to quantify affinity between users.

FIG. 5 shows a sample part of code, in an example of a possible implementation, for an algorithm with which User-to-User similarities may be obtained, which can be implemented in a variety of ways with different programming languages.

FIG. 7 shows examples of equations suitable for use in Community Detection in Complex Networks Using the Principal Eigenvector.

FIG. 8 shows examples of equations suitable for use in Community Detection in Complex Networks Using the Principal Eigenvector.

(FIG. 10 was originally in colour).

DETAILED DESCRIPTION

Maxymiser: What we do

Figure 1:
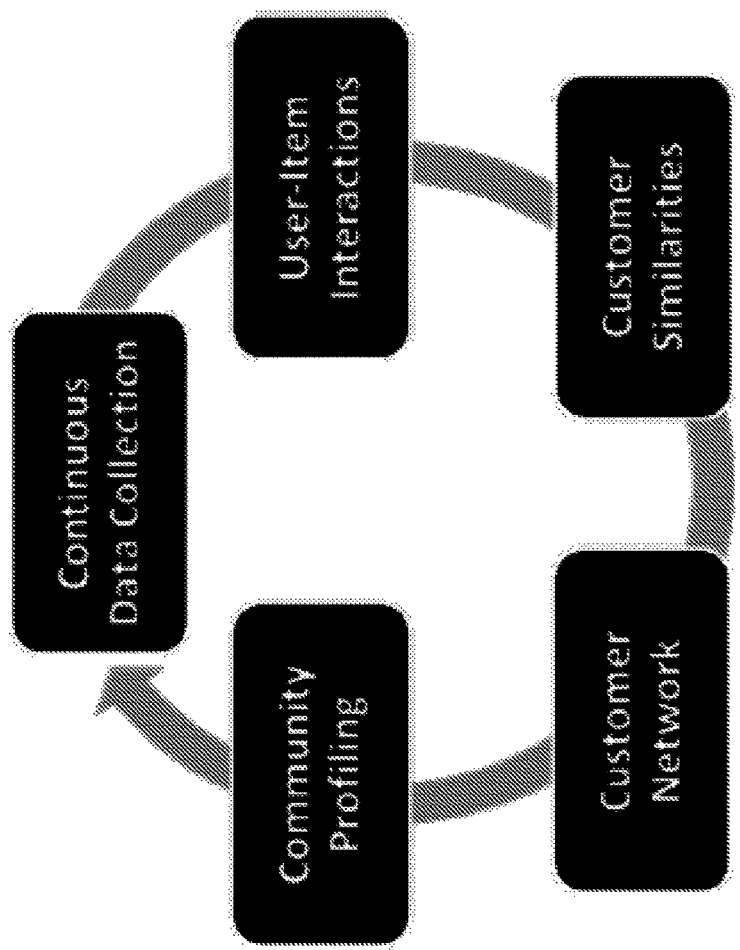
FIG. 1 shows an example of using state-of-the-art network analysis algorithms, which take as input online/offline customer data and transforms it into an implicit 'social' network of customers, from which communities may be derived.

Maxymiser empowers brands to transform every digital interaction into seamless, relevant and engaging customer experiences with its cloud-based testing, personalization and cross-channel optimization solutions. Known for serving billions of individual experiences across every device, Maxymiser leverages customer data to dramatically boost engagement and revenue, while also driving long-term business value. Combined with a team of vertically focused digital experts, Maxymiser's Customer Experience Optimization suite quickly delivers measurable results to every client through A/B and multivariate testing, behavioral targeting and product recommendations for the web, mobile, social and email.

Maxymiser works with some of the world's most iconic brands, including HSBC, EPSON, Virgin Media, Alaska Airlines, Intercontinental Hotel Group, Harry & David, Progressive and Office Depot. Founded in 2006, Maxymiser is headquartered in New York with offices in Chicago, Edinburgh, Dnipropetrovsk, Dusseldorf, London, Munich and San Francisco.

Maxymiser: Our History

We were the first vendor to offer A/B and multivariate testing solutions to many of Europe's leading online brands. A/B testing tests a control, version A, against a different version, version B to measure which is the most successful based on the metric you are measuring. In the online world A/B testing allows you to split traffic on your website so that visitors experience different web page content on version A and version B of a page while you monitor visitor actions to identify the version that yields the highest conversion rate. A conversion rate is the rate at which visitors perform a desired action on your site. By testing with live visitors on your site you learn from real users which experience they prefer.

Before we arrived, many ecommerce brands were making online content decision based on guesswork. This inevitably led to high levels of risk-both for the budget and the brand. Instead of being based on objective, data-driven ideas, major decisions were often thrashed out in team meetings, based on an array of subjective viewpoints. And while web analytics were providing some insights where site visitors were flocking to or straying from, they had no specialized tools guiding them on how to truly fix and boost conversion rates. Maxymiser has given the market the right way to improve online experiences, with testing, personalization and cross channel optimization.

Customer Community Analytics

CuCo Analytics provides marketers with a novel, self-adapting segmentation toolbox which leverages the abundance of online data streams and combines these with datasets from different channels. A new ingredient in the segmentation methodology itself is the use of multi-level community detection algorithms which is related to recent academic research on complex network analysis and social network theory. Even though the underlying mathematical methods are quite involved, the general steps employed in the algorithm are straightforward to explain, as is shown below; the output of this method is easy to understand without only limited technical knowledge and can readily be visualized as a network of inter-connected customers. For example, Maxymiser's OneTouch™ platform, aspects of which are described in WO2010140008(A1) which is incorporated by reference, allows the collection of online click-stream data and the single-view database on which CuCo Analytics relies can easily integrate this data with other sources of information. The methodology is tailor-made for highly scalable cloud-based computing. The use of the OneTouch™ platform also guarantees a very straightforward implementation of content optimization and personalization campaigns, such that marketers can seamlessly action the market segments discovered by CuCo Analytics.

Overview

Maxymiser Customer Community (CuCo) Analytics is a fully-automated, multi-level customer segmentation methodology which may be implemented in online businesses.

CuCo Analytics detects the formation and tracks the evolution of customer and/or visitor communities by analysing clickstream data and mining similarities between profiles, as formed by the online and multi-channel customer or visitor behaviour.

In an example, the core method is based on structural network analysis and community detection in complex networks, which is applied on the natural structure of the customer base, thus dispensing with the need to make a priori hypotheses about the customers.

In an example, CuCo Analytics does not require knowledge of statistical techniques and specifically diverts the marketer away from making assumptions about the makeup of the customer base, the number of customer segments, and related issues.

Here we explain the problems that the core methodology may be used to address and we provide details on the main technical aspects of the methodology.

Main Features of the Methodology

Using state-of-the-art network analysis algorithms, Maxymiser CuCo Analytics addresses the problems facing communications network-based marketers, which take as input the online/offline customer data and transforms it into an implicit 'social' network of customers, from which communities may be derived. Main stages of the method are depicted by way of example in the illustration in FIG. 1 and are explicitly detailed in the following sections.

Details of CuCo Methodology

1. Continuous Data Collection (Collect Data and Store it)

The first step of the method comprises continuous collection of data, from which the customer or visitor profiles are subsequently formed.

This may be achieved seamlessly on any website using the Maxymiser OneTouch™ platform, for example. Online data collected in this way may be stored in a single-view database, in which other datasets from different channels can be imported (e.g., standard CRM data, or information obtained from transactions through offline channels, such as regular post and interactions on the telephone or in-store).

Below is a brief list of some of the main types of data which are normally collected from online visitor behaviour:
 Standard web analytics data such as web entry criteria, search terms, traffic sources, geo location, time and duration of visit, software capabilities, and additional criteria that are set up as needed in each case (e.g., scrolling activity, click-through actions on navigation menus, etc.);
 Visitor behaviour data focusing on the interactions between visitors (both purchasers, i.e. 'customers' and non-purchasers also) and items (products, services, registrations, etc.); in particular, viewing items from within a category, clicking on a product page, adding an item to a shopping cart or registering to use a service, purchasing a product or confirming a transaction are all typical examples of the kinds of data that are collected for the CuCo Analytics database.
 Data collected from all these channels may be stored in a single-view database, in a cloud service, and may be subsequently fed into a structured database schema.

For example, in a simple implementation, we may have a table of Users and a table of Items. The table of Users includes a User_ID (key) and any products that the user has bought (item purchase history), viewed (browsing history), liked (social media engagement history), and so on. The table of Items includes an Item_HASH (key) and additional attributes in relation to each item (e.g., location, size, price, popularity, etc.) FIG. 2 shows a simple example of a least complex SQL query on a table of Items.

2. User-Item Interactions (Construct the User Profile Vectors)

Given such online visitor behaviour data, the CuCo method may extract meaningful interactions between customers or visitors ('users') and products or services ('items'). This leads to a central mathematical object used by CuCo, that is, the User-Item Matrix, which includes information about the interactions of users with items and user or item attributes.

The end result is that, for each User_ID, one can see which items were of interest—i.e., 'rated' according to whether they were liked, clicked-on, viewed, category-viewed, etc.—and also which items the user actually bought/registered for. The rating scale can be defined by the marketer, if necessary, or it can be left unspecified and the method will provide pure counts that do not require a rating scale to be explicitly provided.

Figure 3:
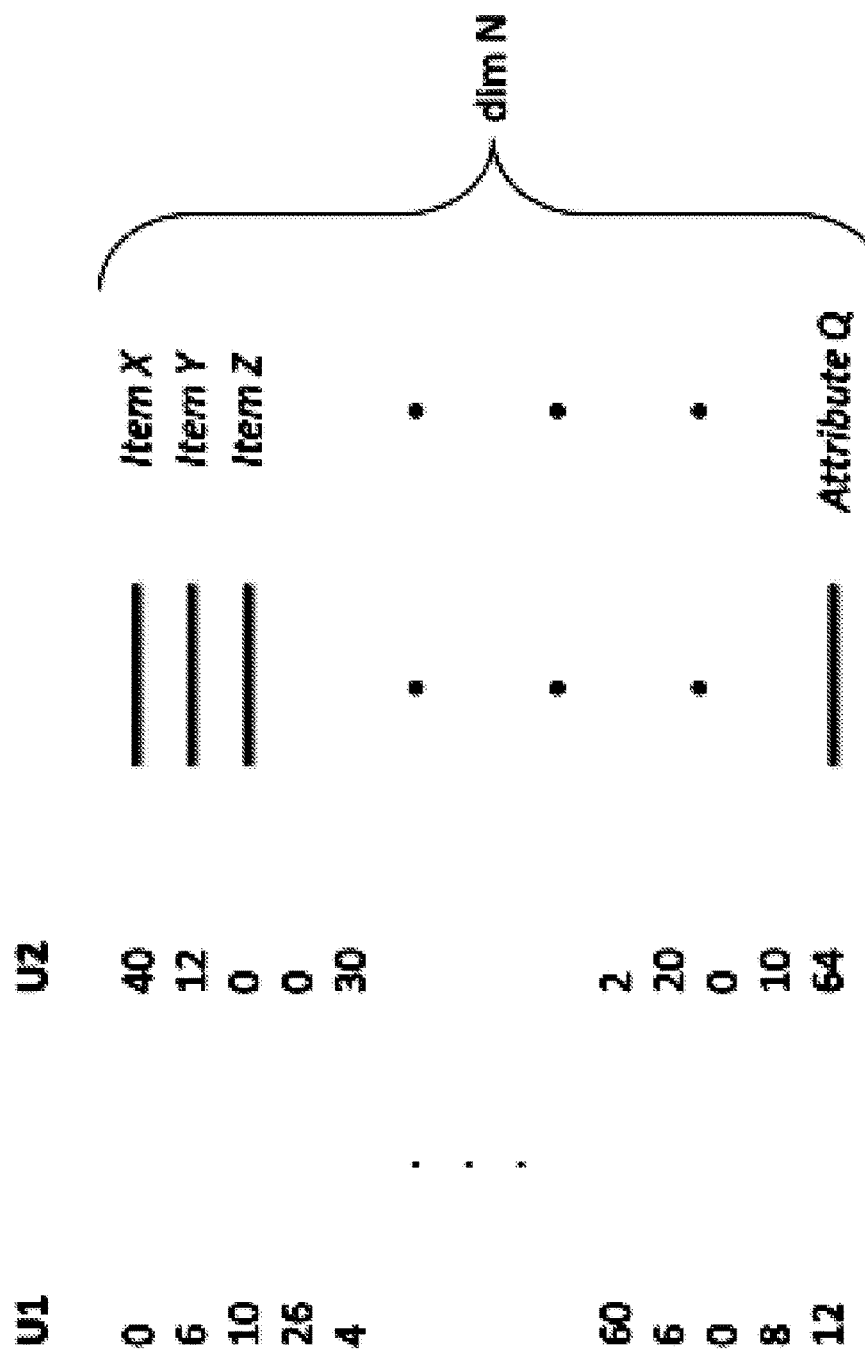
FIG. 3 shows an example of two User Vectors, U1 and U2. In this example, the numerical values correspond to the (explicit or implicit) 'rating' that each User has assigned (or has been given automatically by the method) to each Item or attribute (i.e., feature of the user space or the item space).

For example, in a simple implementation, each User_ID is associated with a vector U in N dimensions, where each dimension corresponds to a feature from the user and item spaces (such as, e.g., user location, user search terms, Item_HASH, price of item, location of item, and so on). An example of two such User Vectors, U1 and U2, is given in FIG. 3. The numerical values correspond to the (explicit or implicit) 'rating' that each User has assigned (or has been given automatically by the method) to each Item or attribute (i.e., feature of the user space or the item space).

This information may then be fed into the next step, which transforms the User-Item interactions into User-User similarities.

3. Customer Similarities (Find Affinities Between User Interests)

If user A has purchased items x, y and z, while user B has purchased items y, z and q then we can say that they are quite similar in their purchasing behaviour (as two out of three items that the users committed to were the same for both users). This example is a simple one; however, in most cases the situation is typically much more complicated. For instance, the two users may have purchased only a few identical items and many different items, which are nevertheless quite similar to each other: A and B may have stayed in many different hotels, while some of these may have been in London, in the same neighbourhood and have the same star rating.

The similarity between customers who have already made a purchase, or between visitors (non-purchasers) who implicitly 'rate' items through their online behaviours, can be quantified very precisely. There are various suitable methods to quantify affinity between users (i.e. similarity between the vectors U1 and U2 of the previous section), with the crucial property, $sim(U1,U2)=sim(U2,U1)$.

Here we only list a few standard cases, which may be implemented as different options in the CuCo method. Each of the following is suitable for particular cases, that is, there is usually a similarity function, which is best suited for any given business or even a business vertical (with its specific list of important visitor and item attributes, such as, e.g., retail, travel, gaming, etc.):

A. Cosine Similarity: $Cos(U1,U2)$
 This similarity metric measures the 'alignment' (angle) between the two vectors, but it does not capture the difference in their magnitudes;
 Its range is from −1 (orientation between the two vectors is exactly opposite) to +1 (orientation is along the same direction for both vectors); a value of 0 implies that they are orthogonal, and hence have nothing in common;

If A=U1 and B=U2 are the vectors for two different users, then cos(A,B) is given by Eq. (A) in FIG. 4.

B. Pearson Correlation: r(U1,U2)

This similarity metric measures the correlation between two vectors, which are treated as sample variables;

Its range is from −1 (perfectly anti-correlated) to +1 (perfectly correlated); a value of 0 implies that there is no correlation between them at all;

If X=U1 and Y=U2 are the two variables with mean values X and Y, then r(X,Y) is given by Eq. (B) in FIG. 4.

C. Jaccard Similarity: J(U1,U2)

This similarity metric is suitable for comparing sets;

Its range is from 0 (no elements in common) to 1 (every element in one set also appears in the other set);

If A is the set of elements of the vector U1, and B is the set of elements of the vector U2, then J(A,B) is given by Eq. (C) in FIG. 4.

Examples of the algorithm to this point, by which we have arrived at the User-to-User similarities, can be implemented in a variety of ways with different programming languages (e.g., C++, C#, Matlab, Java, Python, etc.). In FIG. 5 we show a sample part of code, as one of some possible implementations.

In FIG. 5, the input is the data file 'buyers.csv', which includes the transactions exported via SQL as in the example of step 1. The 'Customer' dictionary brings together the features of all items with which a User_ID has interacted with. We use the Jaccard similarity in this particular implementation, which compares the two sets of 'hits'. The output is written as an edgelist.

4. Customer Network (Map the Customer Base onto a 'Social' Network)

We map website users (customers or visitors) to network nodes.

Then the similarities between users are mapped as links between these nodes.

This is a natural map of the customer base, which is now identified as a network (also called graph with vertices and edges: this is an alternative mathematical terminology from traditional graph theory; vertex=node and edge=link).

The thickness of a link corresponds to the degree of similarity (so, for instance, if users A and B are 80% similar while B and C are 40% similar, the affinity between the first pair will be twice as thick as that of the second).

Figure 6:
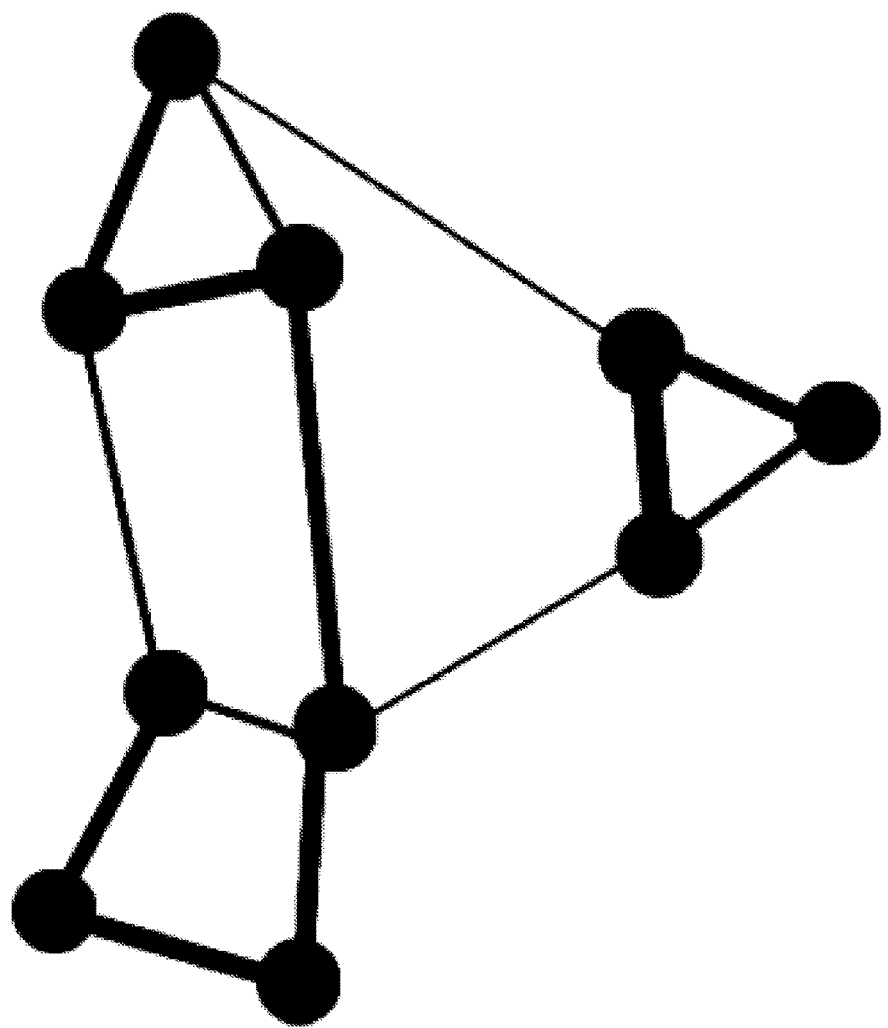
FIG. 6 shows an example of a simple illustration of a customer network map using only a few customers (10 nodes).

A simple illustration using only a few customers (10 nodes) can be found in FIG. 6. A central idea is that this natural encoding of the customer base's inherent structure leads to the emergence of neighbourhoods and hubs that encode customer communities.

5. Community Profiling (Segment the Network into Communities of Customers)

Once the Customer Network has been built (for example, as described above) a key part of the methodology ensues. We employ network analysis tools and social network theory algorithms to discover the important structural characteristics of the network. An example is the Principal Eigenvector Perturbation Algorithm, described below.

The robustness of this analysis relies on the fact that it is the very structure of the Customer Network that dictates the emergence of various Customer Communities. The evolution of these communities is tracked in time via a process loop to stage 1 (see FIG. 1 for example), i.e., the process may return to the continuous data collection and repeat itself. The key structural characteristics include, but are not limited to, Customer Communities (i.e., clusters of customers or visitors who are more connected among themselves than the rest of the customer base); cliques and hubs; authorities and peripheries; bridges and influential carriers of information.

At a final stage of this analysis the emergent Customer Communities are characterized via their most prevalent attributes. For instance, a community might be clearly characterized by its particular interests in certain item categories, an above average value, recency or location of activity, sharp increase or decrease of transactions, churn rates, and many other possible characteristics.

Furthermore, the mapping of the customer base into an implicit 'Social Network' of customers allows us to employ known tools from Social Network theory for the identification of Hubs and authorities (central nodes, which act as a point-of-reference for a group clustered around them);

Cliques (tightly-connected subgroup within a community with specific traits);

Influencers (individual nodes who have disproportionate influence over authorities, central hubs, and cliques);

Bridges (individual nodes who act as 'bridges' in-between communities).

This analysis assists in identifying who to target in each case for the different purposes of Increasing 'Share of Voice';

Increasing 'Share of Market';

Increasing up-sell and cross-sell;

Decreasing churn rates.

Community Detection in Complex Networks Using the Principal Eigenvector

Structural disorder in real-world networks often leads to the emergence of communities. Probing the structure of complex networks and detecting communities are widely studied problems with various potential applications. Here we demonstrate how community structure can be revealed by perturbing a single eigenvector, namely the one corresponding to the principal eigenvalue of the underlying graph's adjacency matrix, with small structural changes. In particular, by removing edges at random and comparing the new principal eigenvector with the initial one, we can perform community detection efficiently and with high sensitivity to fuzzy community membership.

Complex networks are structurally disordered systems with a remarkable range of pattern formation behaviors [1]. One of the central characteristics of a network is the clustering of its nodes into communities. Intuitively, a community is a well-connected area of a network, one whose nodes are linked more among themselves than they are with the rest of the network. It is a hard question how to implement this definition into a working community identification, or detection, algorithm. As a result, community detection in complex networks is a very active field of research [2-A].

Existing methods of probing community structure include various algorithms largely based on shortest paths and discrete-time random walks for defining distances [4, 5]. Eigenspectra of networks (that is, eigenspectra of the corresponding adjacency or Laplacian matrices [6]) have recently been used for community detection[7, 8]. However, in general, computational efficiency can be compromised by the need to calculate a certain number of eigenvalues and eigenvectors of the matrix at hand, if not its entire spectrum.

Here we address the problem with a simple physical picture based on continuous-time random walks. To begin with we remind ourselves that the steady state, for t→∞, is given by the (normalized) principal eigenvector $v_1$, that is, the eigenvector corresponding to the largest eigenvalue $\lambda_1$ of the adjacency matrix A. (whose uniqueness is guaranteed by the Perron-Frobenius theorem). The entries of $v_1$ yield the probability that the random walker ends up on any given node, in the long-time limit, irrespectively of the starting point. We then show that, by removing an edge at random and calculating the probability shifts in the entries of $v_1$, it becomes possible to analyze community structure. The key insight is that members of the same community tend to behave collectively in response to structural instabilities, in the sense that their long-time limit probabilities shift in the same direction after an edge removal.

It is reasonable to expect that the walker is more likely to be found in a well-connected node than one with less connections. We would therefore expect the entries of $v_1$, which yield the likelihood to find the walker on any given node, to be higher for the more central nodes. This intuition is correct and it has indeed been used in the past, in the field of mathematical sociology. In particular, the principal eigenvector can be used to define the eigenvector centrality, introduced by the work of Bonacich [9]. Crucially, a modified version of eigenvector centrality has recently been used to compute an elegant network measure, the dynamical importance [10], which is given by shifts of the principal eigenvalue after an edge (or a node) has been removed. It is therefore clear that structural properties of complex networks can be probed with the principal eigenvalue and eigenvector of the adjacency matrix. Here we add to the list of remarkable applications of this eigenpair by using it to analyze community structure.

I. Continuous-Time Random Walk

A network G(V,E), composed of N=|V| nodes (vertices) and K=|E| edges, can be described by the adjacency matrix $A(G)=[a_{ij}]$, whose elements are $a_{ij}=1$ if (i,j)∈E(G), and $a_{ij}=0$ otherwise. For a weighted network the positive entries of A are not necessarily equal to 1, but may vary according to the weight of each edge. Here we consider un-weighted and undirected ($A_{ij}=A_{ji}$) networks, for simplicity, although we emphasize that our results can be generalized to these cases as well. We denote the spectrum of A(G) by $\{\lambda_j, v_j\}$, for j=1, 2, ... N. With every node j we associate a basis vector j in an N-dimensional vector space. The basis vectors are orthonormal and a standard representation can be adopted, namely, $1=(1\ 0\ \ldots\ 0)^T, 2=(0\ 1\ \ldots\ 0)^T, \ldots, N=(0\ 0\ \ldots\ 1)^T$, where $v^T$ is the transpose of v. The sum of all elements of v can be written succinctly as $\|v\|\equiv 1^T v$, where $1^T \equiv (1\ 1\ \ldots\ 1)$.

With these definitions, a continuous-time random walk on a network G with adjacency matrix A(G) is governed by Eq. (1) in FIG. 7, where x(0) is an arbitrary initial state such that $\|x(0)\|=1$. The probability of finding the walker on a node j at time t is $j^T x(t)$ and its steady state value is given by Eq. (2) in FIG. 7.

We may write the transfer matrix for the continuous-time random walk, exp (At), as $\Sigma_i \exp(\lambda_i t) v_i v_i^T$, in terms of its spectrum. Substituting into Eq. (1), and feeding the result into Eq. (2), we obtain Eq. (2a) in FIG. 7.

The elements of the adjacency matrix A are real and non-negative; assuming that A is irreducible (i.e., the network is strongly connected), the Perron-Frobenius theorem guarantees the existence of a positive largest eigenvalue, $\lambda_1>0$, with multiplicity one, and that the corresponding (normalized) eigenvector $v_1$ is positive [6]. As a result, in the limit t→∞, the term $\exp(\lambda_1 t)$ is much larger than any other term $\exp(\lambda_i t)$ obtained from the spectrum, since $\lambda_1 > \lambda_2 \geq \ldots \geq \lambda_N$. Keeping only this dominant term, the probability becomes one given by expression (2b) in FIG. 7, which gives, after cancellations, Eq. (3) in FIG. 8.

Therefore, the steady state probability $P_j$ of finding the random walker on a node j, is given by the jth element of the (normalized) principal eigenvector of A. The numerical calculation of $v_1$ can be performed efficiently for large networks with the power method, whose computational resources scale as $N^2$ (see, for instance, Ref. [11]).

Suppose now that an edge k is picked randomly from the set E(G), and removed (deleted from the adjacency matrix). From our physical picture based on the random walk of Eq. (1), we expect that the removal of edge k decreases the probability of finding the walker on nodes attached to k. In other words, we expect that the removal of an edge makes it less likely to find the walker on its neighboring nodes. Motivated by this idea, we have performed extensive numerical tests on real and artificial networks. We typically find that, in fact, the removal of an edge decreases probabilities on every node in the community from which it has been removed. Clearly, this implies that the entries of the principal eigenvector shift in the same direction if they are in the same community. The rest of this work is essentially dedicated to investigating this point, and using it for the purposes of community detection.

In order to quantify this collective behavior we focus on the direction of probability flow on node j, via the quantity given by expression (2c) in FIG. 7, where $\tilde{P}_j(k)$ is the probability obtained after the removal of edge k∈E(G). For non-isolated nodes we have $\theta_j(k)\neq 0$ due to conservation of probability; hence $\theta_j(k)=\pm 1$ depending on the sign of the difference between the two probabilities. In terms of the principal eigenvector of A, the direction of the shifts (after an edge k is removed) can be written as Eq. (4) in FIG. 8, where $\delta_k$ is given by Eq. (5) in FIG. 8.

We will now quantify the community membership of a node i in relation to every other node j, using these relative shifts following an edge removal. To this end, we define a node affinity function [12], given by Eq. (6) in FIG. 8, which assumes values between −1 and 1. In the most extreme scenario one would calculate the function for every edge in the network (i.e., r=|E|=K), but of course in practice one rarely needs to do so (typically, as we shall see, it is sufficient to let r≅K/c, where c≳2). The node affinity function probes community structure by quantifying the likelihood that two nodes are in the same community. In particular, whenever $\alpha_{ij}>0$ ($\alpha_{ij}<0$) the nodes i and j are (are not) likely to be in the same community, while $\alpha_{ij}=1$ ($\alpha_{ij}=-1$) implies that they are definitely (definitely not) in the same community.

II. The Principal Eigenvector Perturbation Algorithm (PEPA)

A. Step-by-Step Description of PEPA

Based on the properties of the principal eigenvector and its response to perturbative edge deletions, we construct the following algorithm, which we term the 'Principal Eigenvector Perturbation Algorithm' (PEPA):

1. Given the adjacency matrix A, calculate its principal eigenvector $v_1$ and normalize it.

2. Starting from the adjacency matrix A of the full network, choose an edge k∈E at random, and remove it; the new adjacency matrix is $\tilde{A}=A-\Delta_k$, where $\Delta_k$ is the same size as A and contains only the edge k.

3. Calculate the corresponding principal eigenvector $\tilde{v}_1$ and normalize it.

4. Compute the vector of relative shifts, $\delta_k$, between the two eigenvectors, via Eq. (5).

5. For every node j∈V, assign a value (±1) for the direction of its shift via the quantity $\theta_j(k)$ of Eq. (4).

6. Repeat steps 2 to 5 above for r−1 edges, where r=|E|/c and c∈[1,|E|], always choosing a new edge k'∈E such that k'≠k in step 2.

7. Calculate the node affinity matrix $\alpha$, via Eq. (6).

8. If $\alpha_{ij} \geq \gamma$, where $\gamma$ is a real number between 0 and 1 that acts as a threshold value, then assign the nodes i and j to the same community. Finally, analyze the frequency with which the two nodes appear to be in the same community.

In what follows we apply the algorithm to various real and artificial networks with benchmark community structures, and investigate its performance.

Note that, apart from the adjacency matrix A, the algorithm needs as inputs the real numbers c and $\gamma$. The first number determines the fraction of edges that need be chosen at random for the calculation of the node affinity function. It is relatively easy to evaluate how high c can be from the size of the network (number of edges) and via a final comparison with the results obtained through small reductions in c. The second number determines the cut-off value for the node affinity function $\alpha_{ij}$, which tells us that two nodes (i,j) are in the same community if the value of the function is above cut-off (or in different communities if it is below cut-off). This number is generally harder to determine, as we explain through our detailed examples.

B. Case Study: A Network of Dolphins

Figure 9:
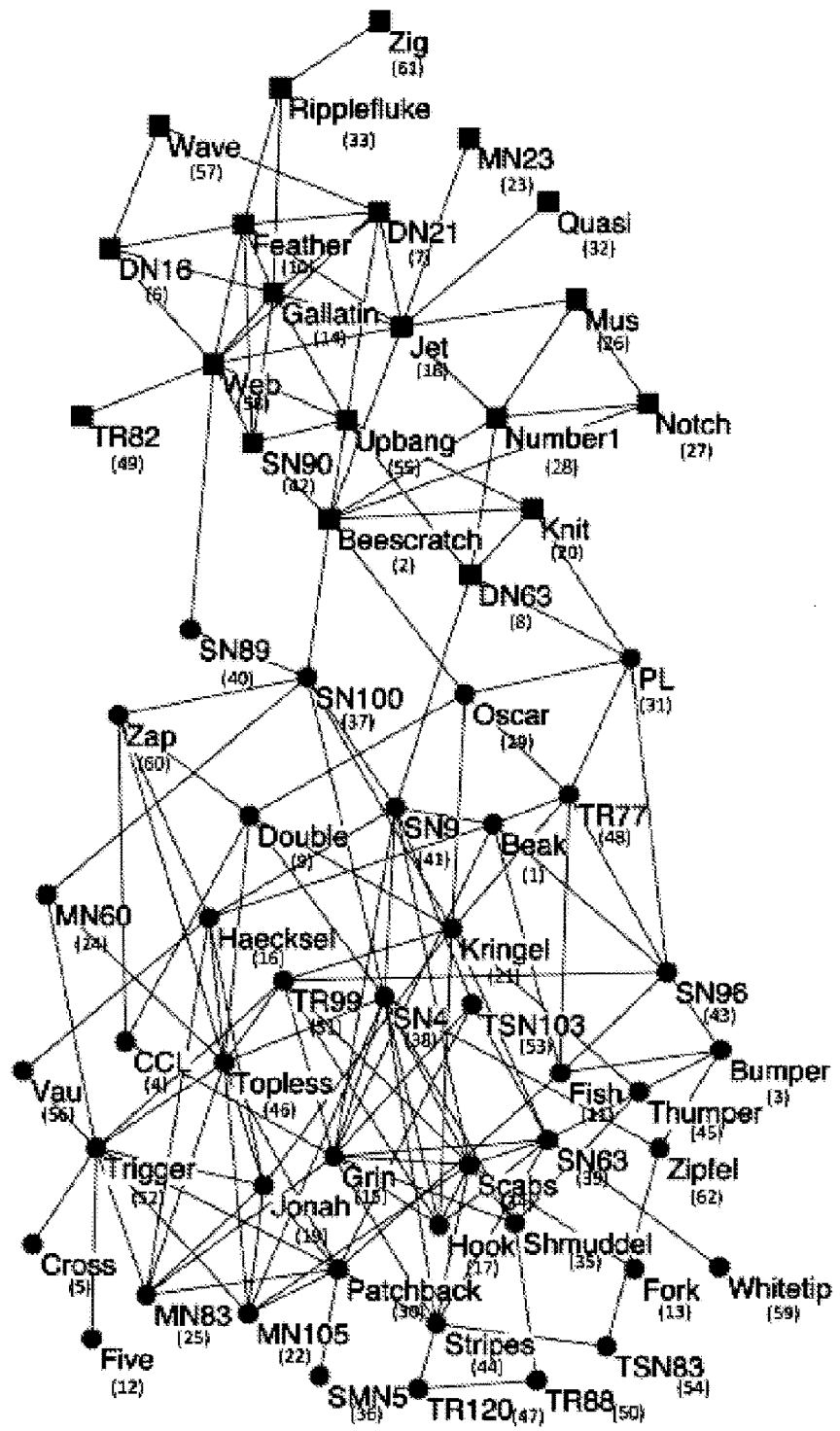
FIG. 9 shows community structure in a network of bottlenose dolphins (BND) [13]. Circles and squares label the communities identified through modularity optimization methods [14], which reproduce the biological classification of the dolphin network (indicated by squares and circles). The dolphins are associated with nodes in the network; node numbers are given under dolphin codenames for ease of reference in our numerical results. (Based on a figure of Reference [14]).

In this section we illustrate the application of the algorithm on the complex network shown in FIG. 9. This benchmark network has a biologically-based classification of communities and it is made up of N=62 bottlenose dolphins (BND) observed in Doubtful Sound (New Zealand) [4, 13]. The edges correspond to dolphins observed to be together more often than expected by chance encounters.

As seen in FIG. 9, there are only six edges connecting the two communities (indicated by squares and circles). These intercommunity edges are joining node pairs (2; 29), (2; 37), (8; 31), (8; 41), (20; 31), and (40; 58). All other edges are intracommunity edges and belong to either the community of squares, or the community of circles. The populations concentrate in highly connected nodes; so, for instance, nodes 15; 34; 38; 46 have higher populations than, say, 6; 26; 54; 59. If we remove an (intracommunity) edge connecting squares, then the populations inside the community of squares are reduced, while the populations inside the community of circles are increased (and vice-versa). The six intercommunity edges can be identified by the fact that if we remove one of them, then population hubs in both communities are increased. We do not present these results here, as we are mostly interested in the node affinity function, as explained below.

Figure 10:
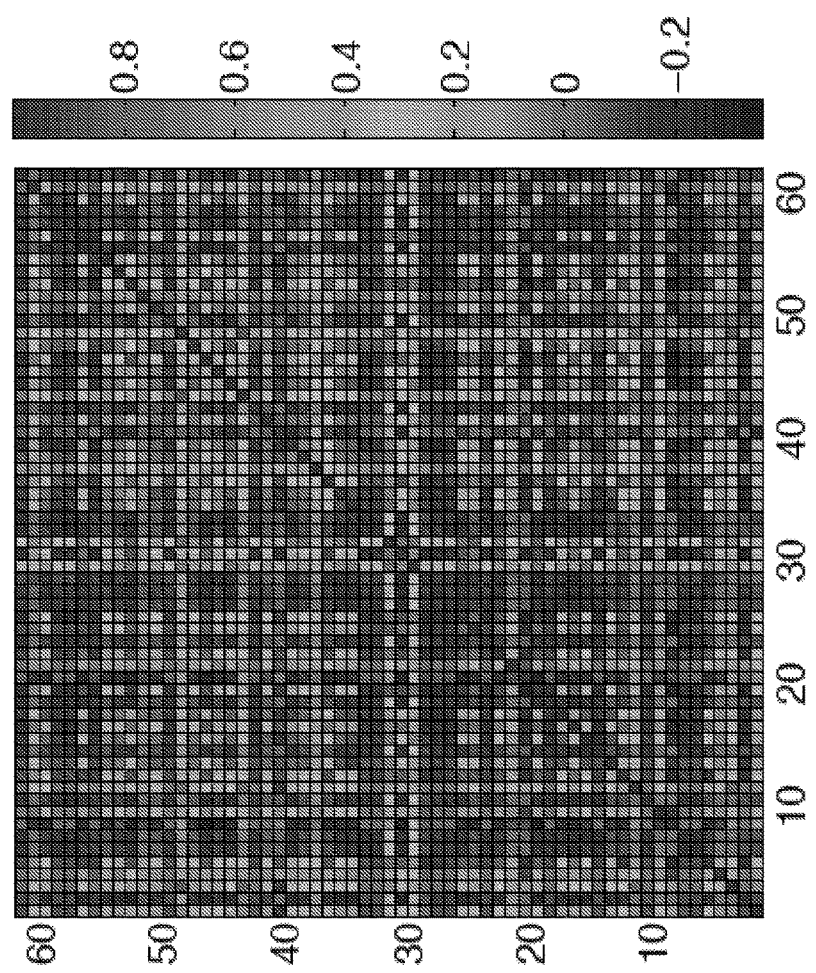
FIG. 10 shows a result of a Principal Eigenvector Perturbation Algorithm (PEPA) algorithm. Here we show the node affinity of Eq. (6) for the BND network of FIG. 9. Correspondence between shades (colors) and numerical values is shown in the vertical bar on the right.

The application of the PEPA algorithm on this complex network leads to an identification of the network's community structure. The end result, the node affinity function of Eq. (6), is presented in FIG. 10. Looking at the affinity of, say, node j=2 (second column) one obtains information about the community structure of the BND network. By combining the results for all nodes, the precise community structure of the network can be read out.

REFERENCES

[1] R. Albert and A.-L. Barab'asi, Rev. Mod. Phys. 74, 47 (2002).

[2] L. Danon, j. Duch, A. Diaz-Guilera, A. Arenas, j. Stat. Mech. P09008 (2005).

[3] M. E. J. Newman, *Network Analysis: an Introduction* (Oxford University Press, 2010).

[4] S. Fortunato, Phys. Rep. 486, 75 (2010).

[5] H. Zhou, Phys. Rev. E 67, 041908 (2003); P. Pons and M. Latapy, Lect. Notes Comput. Sci. 3733, 284 (2005); T. S. Evans and R. Lambiotte, Phys. Rev. E 80, 016105 (2009); X.-Q. Cheng and H.-W. Shen, J. Stat. Mech. P04024 (2010).

[6] C. Godsil and G. Royle, *Algebraic Graph Theory* (New York: Springer-Verlag, 2001).

[7] L. Donetti and M. A. Mu~noz, J. Stat. Mech.: Theory Exp. P10012 (2004); A. Capocci, V. D. P. Servedio, G. Caldarelli, F. Colaion, Physica A 352, 669 (2005); A. Arenas, A. Diaz-Guilera, C. J. Perez-Vicente, Phys. Rev. Lett. 96, 114102 (2006); N. A. Alves, Phys. Rev. E 76, 036101 (2007); H.-W. Shen and X.-Q. Cheng, J. Stat. Mech. P10020 (2010).

[8] S. Chauhan, M. Girvan, E. Ott, Phys. Rev. E 80, 056114 (2009).

[9] P. F. Bonacich, in *Sociological Methodology*, edited by H. Costner (Jossey-Bass, San Francisco, 1972).

[10] j. G. Restrepo, E. Ott, and B. R. Hunt, Phys. Rev. Lett. 97, 094102 (2006); A. Milanese, j. Sun, and T. Nishikawa, Phys. Rev. E 81, 046112 (2010).

[11] G. H. Golub and C. F. V. Loan, *Matrix Computations* (Baltimore: John Hopkins University Press, 1989).

[12] D. I. Tsomokos, Phys. Rev. A 83, 052315 (2011).

[13] D. Lusseau, K. Schneider, O. J. Boisseau, P. Haase, E. Slooten, S. M. Dawson, Behavioral Ecology and Sociobiology 54, 396 (2003); D. Lusseau, Proc. R. Soc. London B 270, S186 (2003).

[14] A. Arenas, A. Fern'andez, S. G'omez, New J. Phys. 10, 053039 (2008).

Method of Segmenting a Plurality of Users into a Plurality of Communities of Users There is provided a method of segmenting a plurality of users into a plurality of communities of users, the method including steps of:

(i) collecting data for constructing a plurality of user profiles corresponding to the plurality of users;

(ii) constructing the plurality of user profiles using the collected data;

(iii) quantifying affinities between the plurality of user profiles;

(iv) constructing a user network map, in which users are represented as nodes, and in which the affinities are represented as links between the nodes, and (v) segmenting the user network map into the plurality of communities of users.

In an example, customer information stored in a Customer Relationship Management (CRM) database system is mapped into a network of customers and then customers are clustered into distinct communities with common needs and interests.

Note

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred example(s) of the invention, it will be apparent to those of ordinary skill in the art that numerous modifications can be made without departing from the principles and concepts of the invention as set forth herein.

Concepts

This disclosure includes multiple concepts, described below as concepts 'A-G'. The following may be helpful in defining these concepts. Aspects of the concepts may be combined.

A. Method of Website Optimisation

There is provided a method of website optimisation for a website hosted on a server system, the website for use by a plurality of users, the method including steps executed by the server system of:

(i) collecting data for constructing a plurality of user profiles corresponding to the plurality of users;
(ii) constructing the plurality of user profiles using the collected data;
(iii) quantifying affinities between the plurality of user profiles;
(iv) constructing a user network map, in which users are represented as nodes, and in which the affinities are represented as links between the nodes;
(v) segmenting the user network map into a plurality of communities of users, and
(vi) providing website content to each user according to the segmented community of each user.

The above may include additionally any of the following, alone or in combination:

- collecting data is performed by collecting clickstream data.
- collected data includes web analytics data or visitor behavior data.
- collected data includes online customer data.
- collected data includes offline customer data.
- the method further comprising the step of feeding collected data into a structured database schema.
- user profiles are constructed using interactions between the users and a plurality of items.
- user profiles are constructed using a user ID for each user, and a user vector U associated with each user ID, the vector U having N dimensions, where each dimension corresponds to a feature from the user and item spaces.
- affinities are quantified using a user-item matrix, wherein the matrix includes data relating to user interactions with the plurality of items.
- data relating to user interactions with the plurality of items is user-assigned.
- data relating to user interactions with the plurality of items is given automatically.
- affinities are quantified using a cosine similarity formula, a Pearson correlation formula, or a Jackard similarity formula.
- a thickness of a respective link between nodes corresponds to a respective affinity between user profiles corresponding to the nodes.
- segmenting the user network map into communities of users is self-adapting.
- segmenting the user network map into communities of users is performed using network analysis tools.
- segmenting the user network map into communities of users is performed using social network theory algorithms.
- segmenting the user network map into communities of users is performed using a Principal Eigenvector Perturbation Algorithm.
- segmenting the user network map into communities of users is performed using multi-level community detection algorithms.
- segmenting the user network map into a plurality of communities of users includes segmenting the user network map into a number of communities, wherein the number is determined using the network map.
- segmenting the user network map into a plurality of communities of users is such that it is the very structure of the user network map that dictates the emergence of various user communities.
- segmenting the user network map into a plurality of communities of users is such that Customer Communities, cliques and hubs; authorities and peripheries; bridges and influential carriers of information are identified.
- the method includes a step of characterizing communities of users via their most prevalent attributes.
- the method is applied iteratively.
- the server system consists of a single server.
- the server system comprises a plurality of servers.
- the server system is cloud-based.

B. Computer Implemented Website Optimisation System

There is provided a computer implemented website optimisation system for website optimisation of a website hosted on a server system, the website for use by a plurality of users, the computer implemented website optimisation system including the server system, the server system running computer software configured to:

(i) collect data for constructing a plurality of user profiles corresponding to the plurality of users;
(ii) construct the plurality of user profiles using the collected data;
(iii) quantify affinities between the plurality of user profiles;
(iv) construct a user network map, in which users are represented as nodes, and in which the affinities are represented as links between the nodes;
(v) segment the user network map into a plurality of communities of users, and
(vi) provide website content to each user according to the segmented community of each user.

The above may include additionally any of the following, alone or in combination:

- The computer implemented website optimisation system, configured to perform a method of any aspect of concept A.

There is provided the computer software of concept B.

C. Server System Hosting a Website

There is provided a server system hosting a website for use by a plurality of users, the server system running computer software configured to:

(i) collect data for constructing a plurality of user profiles corresponding to the plurality of users;
(ii) construct the plurality of user profiles using the collected data;
(iii) quantify affinities between the plurality of user profiles;
(iv) construct a user network map, in which users are represented as nodes, and in which the affinities are represented as links between the nodes;
(v) segment the user network map into a plurality of communities of users, and
(vi) provide website content to each user according to the segmented community of each user.

The above may include additionally any of the following, alone or in combination:

- The server system, configured to perform a method of any aspect of concept A.

D. Computer Terminal Running a User's Application

There is provided a computer terminal running a user's application, the user's application in communication with a server system hosting a website, the user's application identifying the computer terminal to the server system, the server system hosting a website for use by a plurality of users, the server system running computer software configured to:
(i) collect data for constructing a plurality of user profiles corresponding to the plurality of users;
(ii) construct the plurality of user profiles using the collected data;
(iii) quantify affinities between the plurality of user profiles;
(iv) construct a user network map, in which users are represented as nodes, and in which the affinities are represented as links between the nodes;
(v) segment the user network map into a plurality of communities of users, and
(vi) provide website content to each user according to the segmented community of each user.

The above may include additionally any of the following, alone or in combination:
The computer terminal, wherein the server system is configured to perform a method of any aspect of concept A.

E. Method of Segmenting a Plurality of Users

There is provided a method of segmenting a plurality of users into a plurality of communities of users, the method including steps of:
(i) collecting data for constructing a plurality of user profiles corresponding to the plurality of users;
(ii) constructing the plurality of user profiles using the collected data;
(iii) quantifying affinities between the plurality of user profiles;
(iv) constructing a user network map, in which users are represented as nodes, and in which the affinities are represented as links between the nodes, and
(v) segmenting the user network map into the plurality of communities of users.

The above may include additionally any of the following, alone or in combination:
the data for step (i) is collected using customer information relating to customers stored in a Customer Relationship Management (CRM) database system, and in step (iv) the map constructed is a network of customers and then in step (v) customers are clustered into distinct communities with common needs and interests.
collecting data is performed by collecting clickstream data.
collected data includes web analytics data or visitor behavior data.
collected data includes online customer data.
collected data includes offline customer data.
the method further comprising the step of feeding collected data into a structured database schema.
user profiles are constructed using interactions between the users and a plurality of items.
user profiles are constructed using a user ID for each user, and a user vector U associated with each user ID, the vector U having N dimensions, where each dimension corresponds to a feature from the user and item spaces.
affinities are quantified using a user-item matrix, wherein the matrix includes data relating to user interactions with the plurality of items.
data relating to user interactions with the plurality of items is user-assigned.
data relating to user interactions with the plurality of items is given automatically.
affinities are quantified using a cosine similarity formula, a Pearson correlation formula, or a Jackard similarity formula.
a thickness of a respective link between nodes corresponds to a respective affinity between user profiles corresponding to the nodes.
segmenting the user network map into communities of users is self-adapting.
segmenting the user network map into communities of users is performed using network analysis tools.
segmenting the user network map into communities of users is performed using social network theory algorithms.
segmenting the user network map into communities of users is performed using a Principal Eigenvector Perturbation Algorithm.
segmenting the user network map into communities of users is performed using multi-level community detection algorithms.
segmenting the user network map into a plurality of communities of users includes segmenting the user network map into a number of communities, wherein the number is determined using the network map.
segmenting the user network map into a plurality of communities of users is such that it is the very structure of the user network map that dictates the emergence of various user communities.
segmenting the user network map into a plurality of communities of users is such that Customer Communities, cliques and hubs; authorities and peripheries; bridges and influential carriers of information are identified.
the method includes a step of characterizing communities of users via their most prevalent attributes.
the method wherein the method is applied iteratively.
the method is applied using a server system consisting of a single server.
the method is applied using a server system comprising a plurality of servers.
the server system is cloud-based.

F. Computer Implemented System for Segmenting a Plurality of Users

There is provided a computer implemented system for segmenting a plurality of users into a plurality of communities of users, the system running computer software configured to:
(i) collect data for constructing a plurality of user profiles corresponding to the plurality of users;
(ii) construct the plurality of user profiles using the collected data;
(iii) quantify affinities between the plurality of user profiles;
(iv) construct a user network map, in which users are represented as nodes, and in which the affinities are represented as links between the nodes, and
(v) segment the user network map into the plurality of communities of users.

There is provided the computer software of concept F.

G. A Server System for Segmenting a Plurality of Users

There is provided a server system for segmenting a plurality of users into a plurality of communities of users, the server system running computer software configured to:
(i) collect data for constructing a plurality of user profiles corresponding to the plurality of users;
(ii) construct the plurality of user profiles using the collected data;
(iii) quantify affinities between the plurality of user profiles;
(iv) construct a user network map, in which users are represented as nodes, and in which the affinities are represented as links between the nodes, and (v) segment the user network map into the plurality of communities of users.

Note

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred example(s) of the invention, it will be apparent to those of ordinary skill in the art that numerous modifications can be made without departing from the principles and concepts of the invention as set forth herein.

The invention claimed is:

1. A method of website optimisation for a website hosted on a server system, the website for use by a plurality of users, the method including steps executed by the server system of:
   (i) collecting data for constructing a plurality of user profiles corresponding to the plurality of users;
   (ii) constructing the plurality of user profiles using the collected data;
   (iii) quantifying affinities between the plurality of user profiles;
   (iv) constructing a user network map, in which users are represented as nodes, and in which the affinities are represented as links between the nodes;
   (v) generating an initial adjacency matrix, corresponding to the user network map;
   (vi) calculating a principal eigenvector of the initial adjacency matrix;
   (vii) removing a first edge of the initial adjacency matrix, to generate a modified adjacency matrix;
   (viii) calculating a principal eigenvector of the modified adjacency matrix;
   (ix) comparing the principal eigenvector of the initial adjacency matrix with the principal eigenvector of the modified adjacency matrix;
   (x) based on comparing the principal eigenvectors, segmenting the user network map into a plurality of communities of users, and
   (xi) providing website content to each user according to the segmented community of each user.

2. The method of claim 1, wherein segmenting the user network map comprises:
   based on comparing the principal eigenvectors, assigning a value corresponding to a direction of shift for each node;
   calculating a node affinity value for a pair of nodes, based on the direction of shift for each node, of the pair of nodes;
   comparing the node affinity value to a threshold value; and
   segmenting the pair of nodes into a same community if the node affinity value exceeds the threshold value.

3. The method of claim 2, wherein the node affinity value for each pair of nodes is calculated based on a probability of finding a random walker on each node, of the pair of nodes.

4. The method of claim 1, wherein comparing the principal eigenvectors comprises computing a vector of relative shift between the principal eigenvectors.

5. The method of claim 1, wherein steps (vii)-(viii) are performed iteratively, by removing, in turn, each of a plurality of edges of the initial adjacency matrix different from the first edge, to obtain a plurality of eigenvectors of a plurality of modified adjacency matrices.

6. The method of claim 5, the method further comprising the step of averaging the plurality of eigenvectors to generate an averaged eigenvector for comparison to the principal eigenvector of the original matrix.

7. The method of claim 1, wherein user profiles are constructed using interactions between the users and a plurality of items.

8. The method of claim 7, wherein user profiles are constructed using a user ID for each user, and a user vector U associated with each user ID, the vector U having N dimensions, where each dimension corresponds to a feature from the user and item spaces.

9. The method of claim 7, wherein affinities are quantified using a user-item matrix, wherein the matrix includes data relating to user interactions with the plurality of items.

10. The method of claim 9, wherein data relating to user interactions with the plurality of items is user-assigned.

11. The method of claim 10, wherein data relating to user interactions with the plurality of items is given automatically.

12. The method of claim 1, wherein affinities are quantified using a cosine similarity formula, a Pearson correlation formula, or a Jackard similarity formula.

13. The method of claim 1, wherein a thickness of a respective link between nodes corresponds to a respective affinity between user profiles corresponding to the nodes.

14. The method of claim 1, wherein segmenting the user network map into communities of users is self-adapting.

15. The method of claim 1, wherein the collected data includes one or more of: web analytics data, visitor behavior data, online customer data, or offline customer data.

16. The method of claim 1, wherein segmenting the user network map into a plurality of communities of users includes segmenting the user network map into a number of communities, wherein the number is determined using the network map.

17. The method of claim 1, wherein segmenting the user network map into a plurality of communities of users is such that structure of the user network map dictates emergence of various user communities.

18. The method of claim 1, wherein segmenting the user network map into a plurality of communities of users is such that Customer Communities, cliques and hubs; authorities and peripheries; bridges and influential carriers of information are identified.

19. The method of claim 1, wherein the method includes a step of characterizing communities of users via their most prevalent attributes.

20. The method of claim 1, wherein collecting data is performed by collecting clickstream data.

21. The method of claim 1, wherein the server system comprises a plurality of servers.

22. The method of claim 21, wherein the server system is cloud-based.

23. A computer implemented website optimisation system for website optimisation of a website hosted on a server system, the website for use by a plurality of users, the computer implemented website optimisation system including the server system, the server system running computer software configured to:
   (i) collect data for constructing a plurality of user profiles corresponding to the plurality of users;
   (ii) construct the plurality of user profiles using the collected data;

(iii) quantify affinities between the plurality of user profiles;
(iv) construct a user network map, in which users are represented as nodes, and in which the affinities are represented as links between the nodes;
(v) generate an initial adjacency matrix, corresponding to the user network map;
(vi) calculate a principal eigenvector of the initial adjacency matrix;
(vii) remove a first edge of the initial adjacency matrix, to generate a modified adjacency matrix;
(viii) calculate a principal eigenvector of the modified adjacency matrix;
(ix) compare the principal eigenvector of the initial adjacency matrix with the principal eigenvector of the modified adjacency matrix;
(x) based on comparing the principal eigenvectors, segment the user network map into a plurality of communities of users, and
(xi) provide website content to each user according to the segmented community of each user.

24. A non-transitory computer readable medium comprising instructions which, when executed by one or more hardware processors, causes performance of operations comprising:
(i) collecting data;
(ii) segmenting the collected data into a plurality of subsets of data;
(iii) quantifying affinities between the plurality of subsets of data;
(iv) constructing a network map comprising a plurality of nodes, the nodes corresponding to subsets of data, of the plurality of subsets of data, and in which the affinities are represented as links between the nodes;
(v) generating an initial adjacency matrix, corresponding to the network map;
(vi) calculating a principal eigenvector of the initial adjacency matrix;
(vii) removing a first edge of the initial adjacency matrix, to generate a modified adjacency matrix;
(viii) calculating a principal eigenvector of the modified adjacency matrix;
(ix) comparing the principal eigenvectors; and
(x) based on comparing the principal eigenvectors, segmenting the network map into a plurality of communities, based on the subsets of data.

25. The medium of claim 24, wherein the subsets of data, of the plurality of subsets of data, are user profiles corresponding to a plurality of users, and the communities, of the plurality of communities, are communities of users.

26. The medium of claim 25, wherein the operations further comprise providing website content to each user according to the segmented community of each user.

27. The medium of claim 24, wherein segmenting the network map comprises:
based on comparing the principal eigenvectors, assigning a value corresponding to a direction of shift for each node;
calculating a node affinity between a pair of nodes, based on the direction of shift for each node, of the pair of nodes;
comparing the node affinity to a threshold value; and
segmenting the pair of nodes into a same community if the node affinity exceeds the threshold value.

* * * * *